(12) United States Patent
Tsuboi

(10) Patent No.: US 6,414,993 B1
(45) Date of Patent: Jul. 2, 2002

(54) DECODING SYSTEM AVAILABLE FOR COMPRESSED DATA STREAMS FOR CONCURRENTLY REPRODUCING STABLE PICTURES METHOD FOR DECODING COMPRESSED DATA STREAMS AND INFORMATION STORAGE MEDIUM FOR STRONG PROGRAMMED INSTRUCTIONS REPRESENTATIVE OF THE METHOD

(75) Inventor: Eiji Tsuboi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/407,566

(22) Filed: Sep. 28, 1999

(30) Foreign Application Priority Data

Sep. 29, 1998 (JP) ............................................. 10-275449

(51) Int. Cl.[7] ............................. H04B 1/66; H04N 7/12
(52) U.S. Cl. ............................. 375/240.15; 375/240.16
(58) Field of Search .............................. 375/240, 240.1, 375/240.11, 240.12, 240.13, 240.14, 240.15, 240.16, 240.2; 348/423.1, 456, 564, 565; H04N 7/12; H04B 1/66

(56) References Cited

U.S. PATENT DOCUMENTS 5,206,714 A * 4/1993 Kim ............................ 358/22
5,339,321 A * 8/1994 Paek ........................... 371/31
5,343,250 A * 8/1994 Iwamura ..................... 348/564
5,502,464 A * 3/1996 Auld ........................... 348/426
5,682,207 A * 10/1997 Takeda et al. ............... 348/568
6,198,500 B1 * 3/2001 Watanabe et al. ............. 348/17

FOREIGN PATENT DOCUMENTS

| JP | 5-300486 | 11/1993 |
| JP | 5-328321 | 12/1993 |
| JP | 8-70457 | 3/1996 |
| JP | 9-205651 | 8/1997 |
| JP | 9-224251 | 8/1997 |

* cited by examiner

Primary Examiner—Chris Kelley
Assistant Examiner—Tung T Vo
(74) Attorney, Agent, or Firm—Scully, Scott, Murphy & Presser (57) ABSTRACT

An MPEG decoding system concurrently reproduces three pictures on a screen of a display unit on the basis of pieces of video data information representative of different kinds of pictures transferred through three data streams, and an MPEG video controller can select a frame memory from a set of frame memories assigned to any one of the data streams for storing the piece of video data information representative of any kind of picture so that the pictures are stable on the screen by virtue of elimination of a data read-out and a data write-in concurrently carried out on a frame memory in any frame period.

5 Claims, 10 Drawing Sheets

| FIELD | 1 | 2 | 1 | 2 | 1 | 2 | 1 | 2 | 1 | 2 | 1 | 2 |
|---|---|---|---|---|---|---|---|---|---|---|---|---|
| BIT STRING TO BE DECODED | $I_0$ | | $P_1$ | | $P_3$ | | $P_4$ | | $P_5$ | | | |
| PICTURE ON DISPLAY | | | | | $I_0$ top | $I_0$ bottom | $P_1$ top | $P_1$ bottom | $P_2$ top | $P_2$ bottom | $P_3$ top | $P_3$ bottom |
| | | | | | | ← Q | | | | | | |
| NOT USE | 0 | | 2 | | 0 | | 1 | | 2 | | 0 | |
| CORE 0 | 1 | | 0 | | 1 | | 2 | | 0 | | 1 | |
| CORE 1 | 2 | | 1 | | 2 | | 0 | | 1 | | 2 | |
| B | 3 | | 3 | | 3 | | 3 | | 3 | | 3 | |
| WRITE-IN FRAME MEMORY | | | 1 | | 2 | | 0 | | 1 | | 2 | |
| READ-OUT FRAME MEMORY | | | | | 0 | | 1 | | 2 | | 0 | |

Fig. 12

DECODING SYSTEM AVAILABLE FOR COMPRESSED DATA STREAMS FOR CONCURRENTLY REPRODUCING STABLE PICTURES METHOD FOR DECODING COMPRESSED DATA STREAMS AND INFORMATION STORAGE MEDIUM FOR STRONG PROGRAMMED INSTRUCTIONS REPRESENTATIVE OF THE METHOD

FIELD OF THE INVENTION

This invention relates to a decoder for a compressed data stream and, more particularly, to a decoder for concurrently decoding plural compressed data streams, which have been coded through an inter-frame predictive encoding such as MPEG (Motion Picture Experts Group) standards.

DESCRIPTION OF THE RELATED ART

Figure 1:
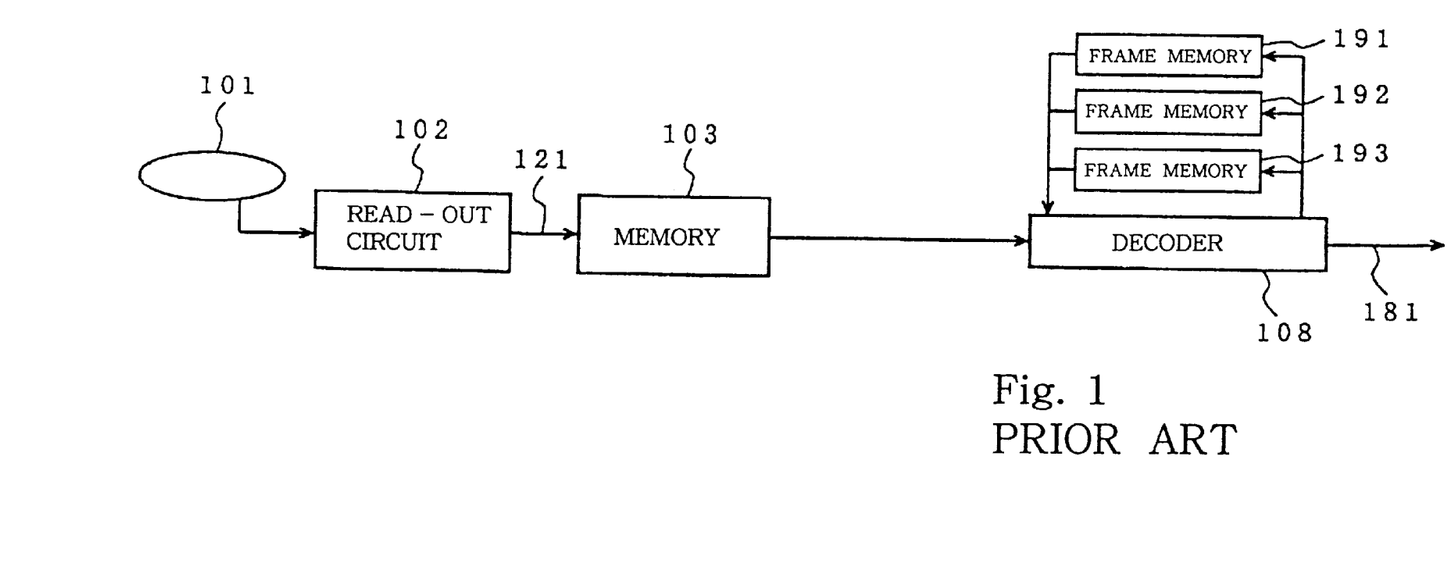
FIG. 1 is a block diagram showing the arrangement of the prior art video decoder.

Firstly, description is made on a prior art decoder for a single data stream. FIG. 1 illustrates a prior art video decoder. Reference numeral 101 designates an optical disk. A video signal and an audio signal are compressed and coded in accordance with the MPEG standards, and bit strings are recorded in the optical disk 101. The optical disk 101 is associated with a read-out circuit 102, and the read-out circuit 102 reads out the bit strings from the optical disk 101 as a single data stream. The single data stream is deinterleaved or separated, and error bits are corrected. Finally, the read-out circuit 102 transfers bit strings 121 to a memory 103 for storing the bit strings 121 therein. A read-out control circuit (not shown) supplies an address signal to the memory 103, and the bit strings 121 are read out from the memory 103 in a different order.

The memory 103 is connected to a decoder 108, and the bit strings 121 are supplied to the decoder 108. The bit strings 121 are decoded. The decoder 108 outputs a reproducing signal 181 for reproducing a picture on a display (not shown). The decoder 108 is connected to frame memories 191/192/193, and the frame memories 191/192/193 stores pieces of video data information representative of reference pictures, i.e., I-picture and P-picture and other pieces of video data information representative of B-picture.

Figure 2:
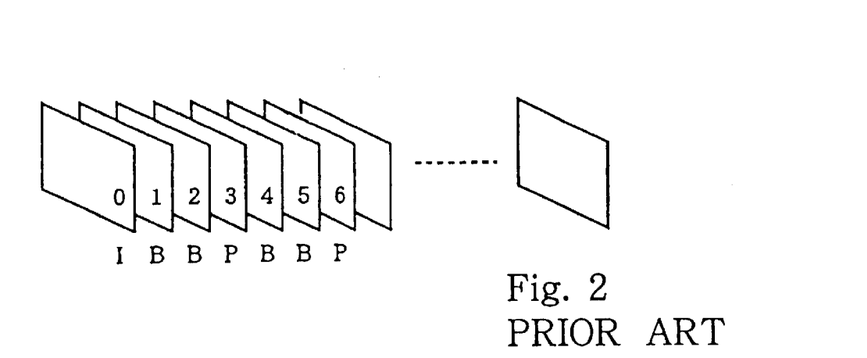
FIG. 2 is a view showing the GOP.

Subsequently, description is made on the predictive method for the MPEG system. FIG. 2 illustrates a GOP (Group Of Picture). Plural frames 0, 1, 2, 3, 4, 5, 6, . . . successively appear, and each frame contains pieces of video data information representative of a picture. The frame number is increased with time. The frame 6 is next to the frame 5, and the pictures are successively reproduced in the order of frame number. "I", "B" and "P" are selectively assigned to the frames 0, 1, 2, 3, 4, 5, 6 . . . , and indicate kinds of pictures. The picture labeled with "P" is referred to as "P-picture", and the picture labeled with "I" and the picture labeled with "B" are referred to as "I-picture" and "B-picture", respectively. The I-picture is coded by using pieces of data information only in the frame. P-picture or I-picture is to be called as a core picture. The P-picture is a kind of unidirectional predictive coded picture, and is coded by using an I-picture or a P-picture three frames before it as a reference picture. For example, the P-picture in the frame 6 is unidirectionally coded through the predictive encoding technique by using the P-picture in the frame 3 as the reference picture. The B-picture features the MPEG system. The B-picture is a kind of bidirectional predictive coded picture, and is coded by using the pictures in both sides thereof as the reference picture. For example, the B-picture is the frame 5 is bidirectionally coded through the predictive encoding technique by using the P-pictures in the frames 3 and 6.

Figure 3:
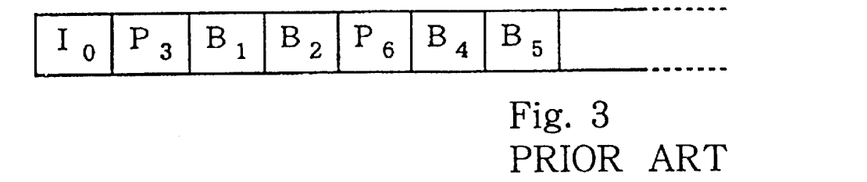
FIG. 3 is a view showing the bit string representative of the coded pictures in the frames.

When the pictures in the frames 0 to 6 are coded, bit strings I0, P3, B1, B2, P6, B4 and B5 are arranged as shown in FIG. 3. The reference I0 means the bit string representative of the I-picture in the frame 0, and the reference P3 means the bit string representative of the P-picture in the frame 3. The reference B1 means the bit string representative of the B-picture in the frame 1. Thus, the bit strings I0–B5 are arranged differently from the frames 0 to 6 in order to effectively decode the bit strings.

Turning back to FIG. 1, the prior art video image decoder reproduces the pictures as follows. The read-out circuit 102 reads out pieces of data information from the optical disk 101, and supplies the bit strings 121 to the memory 103. The bit strings 121 follow the order of frames 0, 1, 2, 3, 4, 5, 6, . . . , i.e., I0, B1, B2, P3, B4, B5, P6, . . . The bit strings 121 are written into the memory 103, and are rearranged into the order shown in FIG. 3 in the memory 103.

Subsequently, the bit strings 121 are sequentially read out from the memory 103. The bit strings are arranged as I0, P3, B1, B2, P6, B4, B5, . . . as shown in FIG. 3. The bit strings I0, P3, B1, B2, P6, B4, B5, . . . are successively supplied to the decoder 108, and are decoded as the reproducing signal 181. While the decoder 108 is decoding the bit strings, the bit strings I0, P3, B1, B2, P6, B4, B5, . . . are processed as follows. Firstly, the bit string I0 is decoded, and the decoded signal DI0 is stored in the frame memory 191. The decoded signal DI0 is output as the reproducing signal 181. The decoder 108 refers to the decoded signal DI0 representative of the I-picture stored in the frame memory 191, and the bit string P3 is decoded to decoded signal DP3. The decoded signal DP3 is stored in the frame memory 192, and is output as the reproducing signal 181. Subsequently, the decoder 108 refers to the decoded signals DI0 and DP3 stored in the frame memories 191/192, and the bit string B1 is decoded to a decoded signal DB1. The decoded signal DB1 is stored in the frame memory 193, and forms a part of the reproducing signal 181. The decoder 108 also refers to the decoded signals DI0 and DP3 stored in the frame memories 191/192, and the bit string B2 is decoded to a decoded signal DB2. The decoded signal DB2 is stored in the frame memory 193, and forms a part of the reproducing signal 181. The decoder 108 refers to the decoded signal DP3 stored in the frame memory 192, and the bit string P6 is decoded to a decoded signal DP6. The decoded signal DP6 is stored in the frame memory 191, because the decoded signal DP0 has been already unnecessary.

Figure 4:
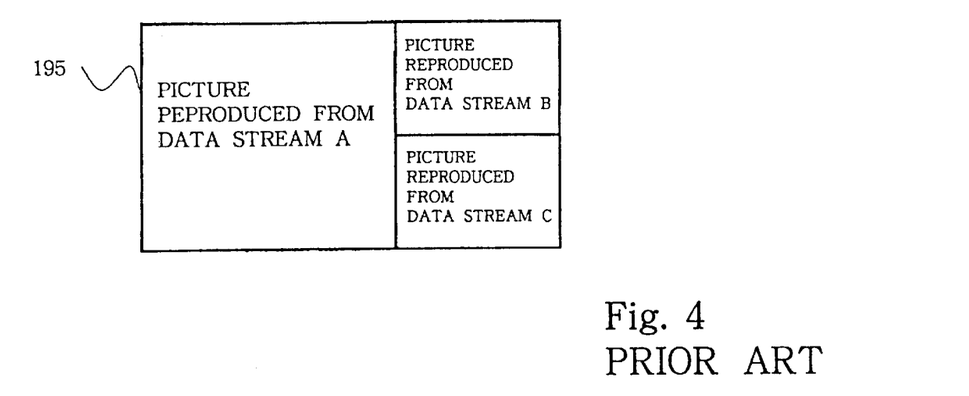
FIG. 4 is a view showing the pictures concurrently reproduced on the display.

The prior art video decoder effectively reproduces the reproducing signal 181 from the single data stream read out from the optical disk 101. However, the circuit arrangement of the prior art video decoder is less pertinent to the reproduction of pictures from plural data streams. FIG. 4 illustrates three pictures reproduced on a display 195. The picture on the left side of the display 195 is reproduced from a compressed data stream A, and the pictures on the right side are reproduced from compressed data streams B and C, respectively. The MPEG decoder is used for the compressed data streams A, B and C, and the compressed data streams contain bit strings representative of B-pictures.

Figure 5:
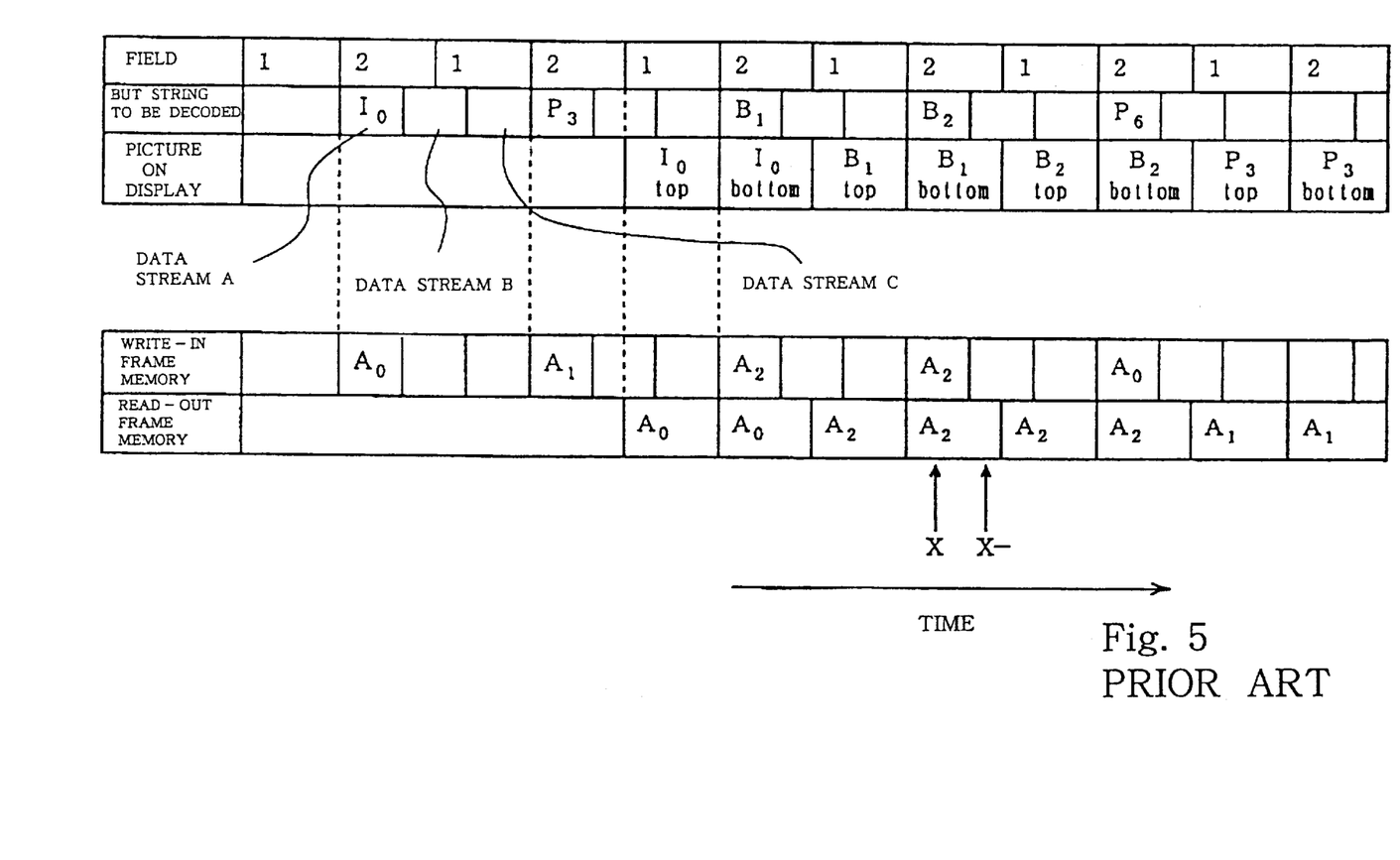
FIG. 5 is a timing chart showing the concurrent reproduction of plural pictures on the display.

The three pictures are concurrently reproduced on the display 195 through the decoding shown in FIG. 5. Time passes from the left side to the right side. FIG. 5 shows "FIELD", "BIT STRING TO BE DECODED", "PICTURE ON DISPLAY", "WRITE-IN FRAME MEMORY" and "READ-OUT FRAME MEMORY" for the compressed data stream A. "WRITE-IN FRAME MEMORY" and "READ-OUT FRAME MEMORY" mean the frame memory in which a decoded signal is to be written and the frame memory from which a decoded signal is to be read out, respectively. A picture stored in a frame is reproduced on a display through two scannings. Frame "1" and frame "2" are indicative of the first scanning and the second scanning, respectively, and are corresponding to "top" of the picture to be displayed and "bottom" of the picture to be displayed, respectively. Although the second row "BIT STRINGS TO BE DECODED" indicates the bit strings of the compressed data stream A, the bit strings of the compressed data stream B and the bit strings of the compressed data stream C are also decoded in two third of each frame in a time sharing fashion. Similarly, the third row "PICTURE ON DISPLAY" indicates the pictures reproduced from the compressed data stream A, and FIG. 5 is silent to the pictures reproduced from the compressed data stream B and the pictures reproduced from the compressed data stream C. However, the pictures reproduced from the compressed data stream B and the pictures reproduced from the compressed data stream C are concurrently reproduced on the display 195 as shown in FIG. 4. In the following description, the second field "2" of a frame and the first field "1" of the next frame are assigned to a bit string to be decoded, and the total time period is referred to as "decoding period". A time period assigned to each frame is referred to as "frame period". An upper portion of a picture is labeled with a reference designating the associated bit string plus "top", and a lower portion of the picture is labeled with the reference plus "bottom".

The bit string I0 of the data stream A is decoded in the first decoding period, i.e., field "2" of the first frame and field "1" of the second frame, and the decoded signal DI0 is stored in the frame memory A0. The bit string P3 is decoded in the second decoding period, i.e., field "2" of the second frame and field "1" of the third frame, and the decoded signal DP3 is written into the frame memory A1. The decoded signal DI0 representative of an upper portion I0top of the picture is read out form the frame memory A0, and the upper portion I0top is reproduced on the display 195 in field "1" of the third frame or the latter half of the second decoding period.

In the third decoding period, the bit string B1 is decoded, and the decoded signal DB1 is written into the frame memory A2. The decoded signal DI0 representative of a lower portion I0botom is read out from the frame memory A0, and the lower portion I0botom is reproduced on the display 195. Further, the decoded signal DB1 representative of an upper portion B1top is read out from the frame memory A2, and the upper portion B1top is reproduced on the display 195.

The fourth decoding period is troublesome. In the first half X of the fourth decoding period, it is necessary to concurrently carry out a data read-out and a data write-in. In detail, the bit string B2 is decoded, and the decoded signal DB2 is written into the frame memory A2. The decoded signal DB1 representative of the lower portion B1botom is read out from the frame memory A2, and the lower portion B1bottom is reproduced on the display 195. Thus, the data read-out and the data write-in are concurrently carried out in the first stage of the fourth decoding period. However, the data write-in is completed earlier than the data read-out. The read-out of the decoded signal DB2 and the reproduction of the picture start from the latter half of the third decoding period, and are carried out on the picture before the write-in and the picture after the write-in. In other words, The decoded signal DB1 is to be maintained until X-. However, the decoded signal DB1 is replaced with the decoded signal DB2 at time X. The replacement damages the decoded signal DB1, and the picture on the display 195 is disturbed. The reason for the disturbance is that only a third of the decoding period is assigned to the bit string of the data stream A. The time period is too short to carry out the data read-out and the data write-in. If three MPEG video decoders arc prepared for the three data streams A, B and C, the parallel decoding eliminates the above-described disturbance from the pictures. However, the circuit components are increased, and the manufacturer suffers from great production cost.

Figure 6:
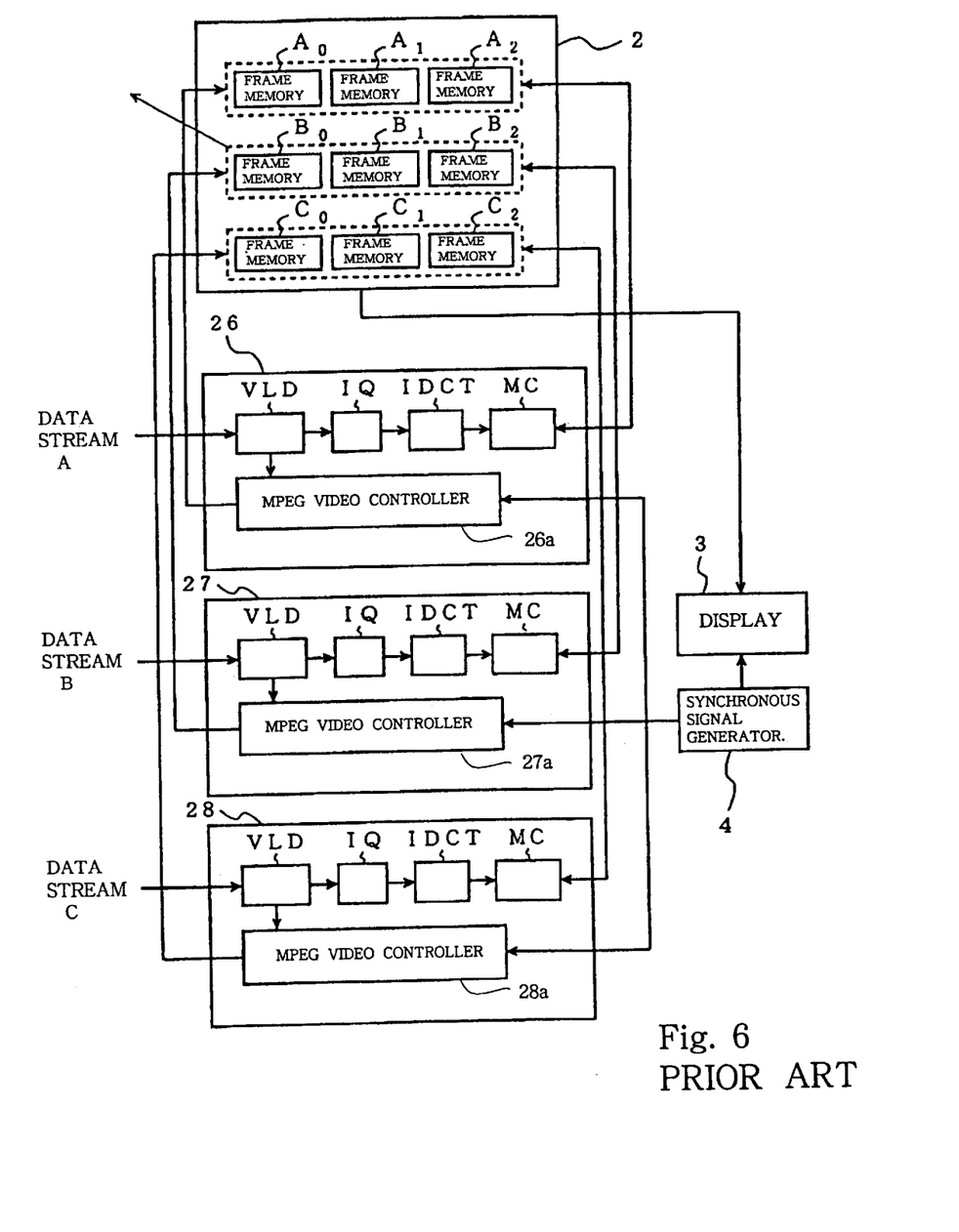
FIG. 6 is a block diagram showing the circuit arrangement of the prior art MPEG decoding system for concurrently reproducing three pictures on the display.

FIG. 6 is the prior art MPEG decoding system of the type having plural decoders. Three data streams A, B and C are supplied to MPEG video decoders 26/27/28, respectively, and the MPEG video decoders 26/27/28 are respectively associated with frame memories A0/A1/A2, frame memories B0/ B1/B2 and frame memories C0/C1/C2. The frame memories A0-A2, B0-B2 and C0–C2 as a whole constitute a memory 2, and the memory 2 is connected to a display 3. A synchronous signal generator 4 supplies a synchronous signal to MPEG video controllers 26a/27a/28a forming parts of the MPEG video decoders 26/27/28, respectively. Each of the MPEG video decoders 26/27/28 further includes a variable-length decoder VLD, an inverse quantizer IQ, two-dimensional inverse discrete cosine converter IDCT and a motion compensator MC.

The MPEG video decoder 26 stores the bit strings representative of core pictures and the bit strings representative of B-pictures in the frame memory A0 or A1 and the frame memory A2, respectively, for the data stream A. The MPEG video decoder 27 stores the bit strings representative of core pictures and the bit strings representative of B-pictures in the frame memory B0 or B1 and the frame memory B2, respectively, for the data stream B. The MPEG video decoder 28 stores the bit strings representative of core pictures and the bit strings representative of B-pictures in the frame memory C0 or C1 and the frame memory C2, respectively, for the data stream C. Thus, the MPEG video decoders 26/27/28 process the data streams A, B and C in parallel, and three pictures are reproduced on the display 3.

SUMMARY OF THE INVENTION

It is therefore an important object of the present invention to provide an MPEG decoder, which concurrently reproduces plural pictures on a display without disturbance of the picture.

It is also an important object of the present invention to provide a method for concurrently reproducing plural stable pictures.

It is also an important object of the present invention to provide an information storage medium for storing programmed instructions representative of the method.

To accomplish the object, the present invention proposes to prepare frame memories more than the frame memories required for producing any piece of video data information.

In accordance with one aspect of the present invention, there is provided a decoding system for producing pieces of video data information representative of plural kinds of pictures to be reproduced on a screen of a display from compressed data streams having bit strings representative of the plural kinds of pictures and coded through an inter-frame predictive coding technique, and the decoding system comprises plural memories respectively assigned to the compressed data streams, each of the plural memories having plural frame memories more than frame memories required for producing any one of the pieces of video data information, a decoding section selectively supplied with the bit strings of the compressed data streams and producing output signals representative of the pieces of video data information and a first control signal representative of one of the plural kinds of picture represented by the bit string just processed, an information processor connected to the decoding section, producing the pieces of video data information from the output signals or through an information processing between the pieces of video data information represented by the output signals and the pieces of video data information already stored in the plural memories and storing each of the pieces of video data information in one of the plural frame memories of the associated one of the plural memories and a controller responsive to the first control signal so as to select one of the plural frame memories of associated one of the plural memories and instructing the information processor to transfer the piece of video data information produced from the bit string just processed to the aforesaid one of the plural frame memories for replacing an invalid piece of video data information already stored therein with the piece of video data information.

In accordance with another aspect of the present invention, there is provided a method for concurrently reproducing plural pictures on a screen of a display comprising the steps of a) selectively supplying plural bit strings respectively extracted from plural compressed data streams to a decoding section in a time sharing fashion for producing pieces of video data information representative of the plural pictures in a first frame period, b) selecting unused frame memories from plural memories each consisting of plural frame memories more than frame memories required for producing one of the pieces of video data information representative of one of the plural pictures in the first frame period, c) storing the pieces of video data information in the unused frame memories in the first frame period and d) transferring the pieces of video data information from the unused frame memories to a display in a second frame period after the first frame period.

In accordance with yet another aspect of the present invention, there is provided an information storage medium for storing a set of programmed instructions to be executed by a data processor, the set of programmed instructions realizes a method for concurrently reproducing plural pictures on a screen of a display comprising the steps of a) selectively supplying plural bit strings respectively extracted from plural compressed data streams to a decoding section in a time sharing fashion for producing pieces of video data information representative of the plural pictures in a first frame period, b) selecting unused frame memories from plural memories each consisting of plural frame memories more than frame memories required for producing one of the pieces of video data information representative of one of the plural pictures in the first frame period, c) storing the pieces of video data information in the unused frame memories in the first frame period and d) transferring the pieces of video data information from the unused frame memories to a display in a second frame period after the first frame period.

BRIEF DESCRIPTION OF THE DRAWINGS

The features and advantages of the decoder, the method and the information storage medium will be more clearly understood from the following description taken in conjunction with the accompanying drawings in which.

DESCRIPTION OF THE PREFERRED EMBODIMENT

Figure 7:
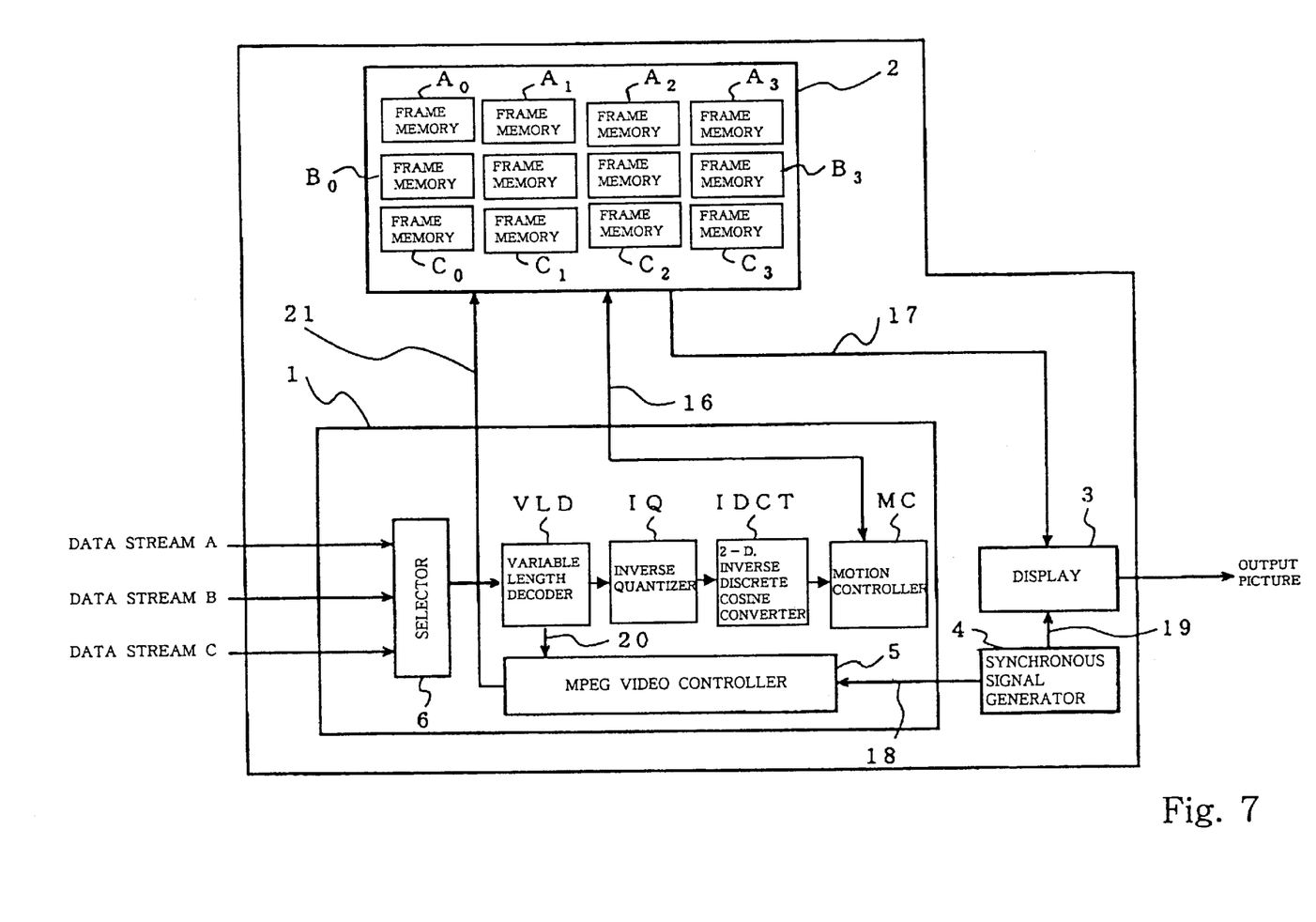
FIG. 7 is a block diagram showing the circuit configuration of an MPEG decoding system according to the present invention.

Referring to FIG. 7 of the drawings, an MPEG decoding system largely comprises a single MPEG video decoder 1, a memory 2, a display 3 and a synchronous signal generator 4. Three compressed data streams A, B and C are supplied to the MPEG video decoder 1, and bit strings of the data streams A, B and C are decoded to decoded signals. The decoded signals are stored in the memory 2, and are selectively read out therefrom. The decoded signals are supplied to the display 3, and reproduce pictures on the display 3 as shown in FIG. 4. Even though the three data streams A, B and C concurrently arrive at the MPEG video decoder 1, the only one MPEG video decoder 1 decodes the bit strings of the data streams A/B/C using a picture as the unit. In order to make the parallel decoding possible, four frame memories A0/A1/A2/A3, B0/B1/B2/B3 and C0/C1/C2/C3 are assigned to each of the data streams A/B/C. The frame memories A0/A1/A2/A3, B0/B1/B2/ B3 and C0/C1/C2/C3 stores decoded signals representative of any kind of picture. In other words, there is not any relation between the frame A0/A1/A2/A3, B0/B1/B2/B3/C0/C1/C2/C3 and the kind of picture such as, the core picture, the B-picture and the I-picture. The usage of the frame memory A0/Al/A2/A3, B0/B1/B2/B3/C0/C1/C2/C3 is realized by using a new controlling method. The synchronous signal generator 4 generates synchronous signals 18/19, and supplies the synchronous signals 18/19 to the MPEG video decoder 1 and the display 3, respectively.

As known to skilled person, the MPEG technology is a high-efficiency data compaction encoding based on an interframe predictive encoding technique. The predictive methods for plural frames are changeable so as to achieve a high compression efficiency and reproduction from an intermediate point in the sequence.

The MPEG video decoder 1 includes an MPEG video controller 5, a selector 6, a variable length decoder VLD, an inverse quantizer IQ, a two-dimensional inverse discrete cosine converter IDCT and a motion compensator MC. The MPEG video controller 5 realizes the new controlling method as will be described hereinlater in detail. The data streams A/B/C are supplied to the selector 6, and the selector 6 transfers bit strings of the data streams A/B/C to the variable length decoder VLD in a time sharing manner. Pieces of video data information are represented by variable length video data codes, and the variable length decoder VLD decodes the variable length video data codes to decoded signals. The variable length decoder VLD determines the kind of picture represented by the variable length video data code, and produces a control signal 20 representative of the kind of picture. The control signal 20 is supplied to the MPEG video controller 5.

The decoded signals are supplied to the inverse quantizer IQ, and are inversely quantized. The quantized signals are supplied to the two-dimensional inverse discrete cosine converter IDCT, and are subjected to the two-dimensional inverse cosine conversion. The converted signals are supplied to the motion compensator MC.

The motion compensator MC differently behaves depending upon the kind of picture represented by the converted signal. When the converted signal represents an I-picture, the motion compensator MC supplies the converted signal to the memory 2. The piece of video data information representative of the I-picture are stored in the memory 2. If the converted signal represents a P-picture, the motion compensator MC reads out the piece of video data information representative of the core picture from the memory 2, and adds the piece of video data information representative of the P-picture to the piece of video data information representative of the core picture. The sum, i.e., a new piece of video data information is written into the memory 2. If the converted signal represents a B-picture, the motion compensator MC reads out the pieces of video data information representative of the core pictures from the memory 2, and adds the piece of video data information representative of the B-picture to the pieces of video data information representative of the core pictures. As described hereinbefore, the core picture is the I-picture or the P-picture. The sum, i.e., a new piece of video data information is written into the memory 2.

The synchronous signal 18 and the control signal 20 are supplied to the MPEG video controller 5. The MPEG video controller 5 determines an address of the memory 2 where the piece of video data information is written and read out. An address signal 21 represents the address, and is supplied to the memory 2. The pieces of video data information are read out from the addresses of the memory 2, and are supplied to the display 3. The display 3 is responsive to the synchronous signal 19 so as to reproduce an output picture.

Figure 8:
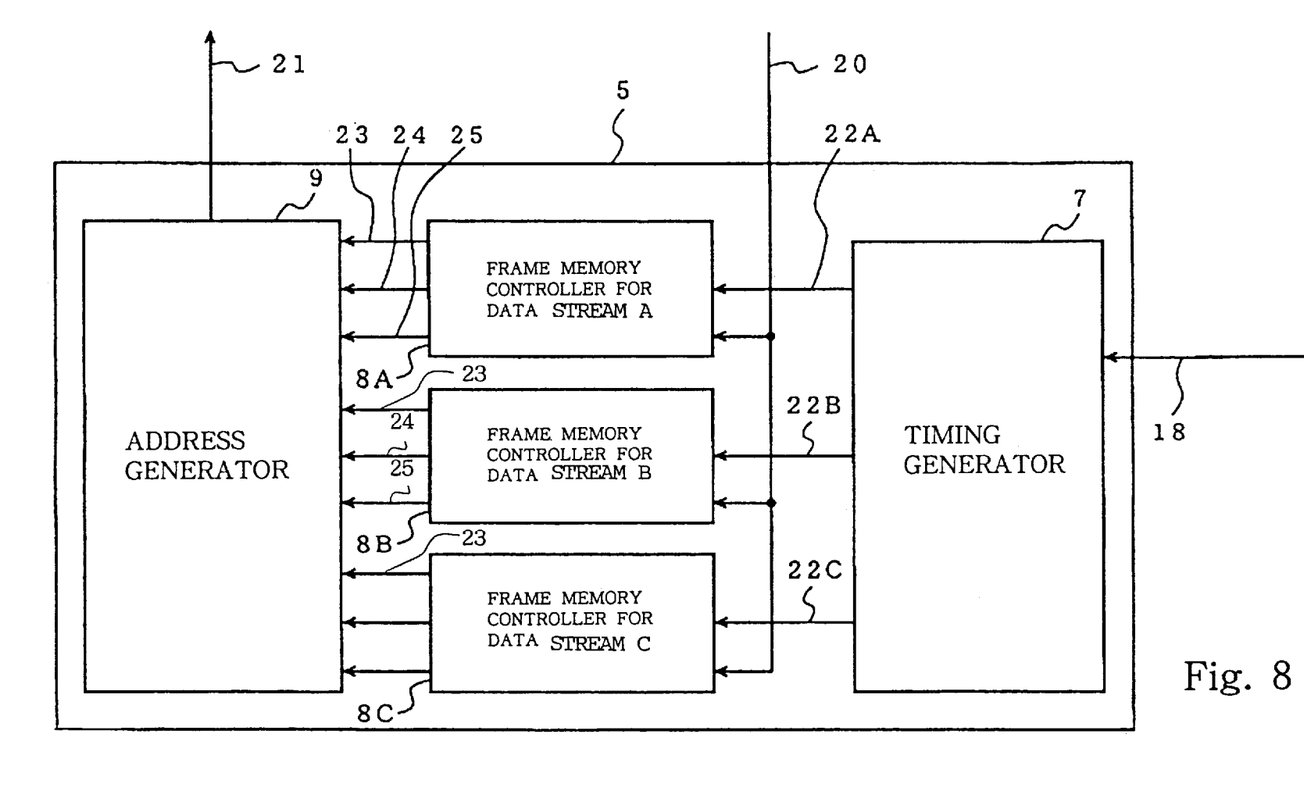
FIG. 8 is a block diagram showing the circuit configuration of an MPEG video controller incorporated in the MPEG decoding system.

Turning to FIG. 8 of the drawings, the MPEG video controller 5 is illustrated in detail. The MPEG video controller 5 includes a timing generator 7, frame memory controllers 8A/8B/8C and an address generator 9. The timing generator 7 is responsive to the synchronous signal 18 so as to supply initiation signals 22A/22B/22C to the frame memory controllers 8A/8B/8C, respectively. The initiation signal 22A/22B/22C is indicative of an initiation of the decoding, and is generated at regular intervals once a frame period on the display 3.

The frame controller 8A for the data stream A behaves as follows. The initiation signal 22A and the control signal 20 are supplied to the frame controller 8A. The frame controller 8A generates three memory control signals 23/24/25. The first memory control signal 23 is representative of a reference code A0/A1/A2/A3 assigned to the frame memory to which a piece of video data information is written. The second memory control signal 24 is representative of a reference code A0/A1/A2/A3 assigned to the frame memory from which a piece of video data information is read out.

The third memory control signal 25 is also representative of a reference code A0/A1/A2/A3 assigned to the frame memory from which another piece of video data information is read out.

Assuming now that the control signal 20 indicates that the piece of video data information represents an I-picture, the frame memory controller 8A generates the first memory control signal 23, only. When the control signal 20 is indicative of a P-picture, the frame memory controller 8A generates the second memory control signal 24 as well as the first memory control signal 23. If the picture is a B-picture, the frame memory controller 8A generates all the memory control signals 23/24/25. The other frame memory controllers 8B/8C behave similarly to the frame memory controller 8A, and no further description is hereinbelow incorporated.

The memory control signals 23/24/25 are supplied from each of the frame memory controllers 8A/8B/8C to the address generator 9. The address generator 9 is responsive to the memory control signals 23/24/25 so as to generate the address signal 21. The address signal 21 is supplied to the memory 2.

The MPEG video decoding system behaves as follows. The data streams A, B and C are assumed to represent pieces of video data information transferred through three independent channels of a television broadcasting. The pieces of video data information are coded with reference to MPEG standards. The MPEG video decoding system is to reproduce three pictures on the display 3 as similar to those shown in FIG. 4.

Figure 9:
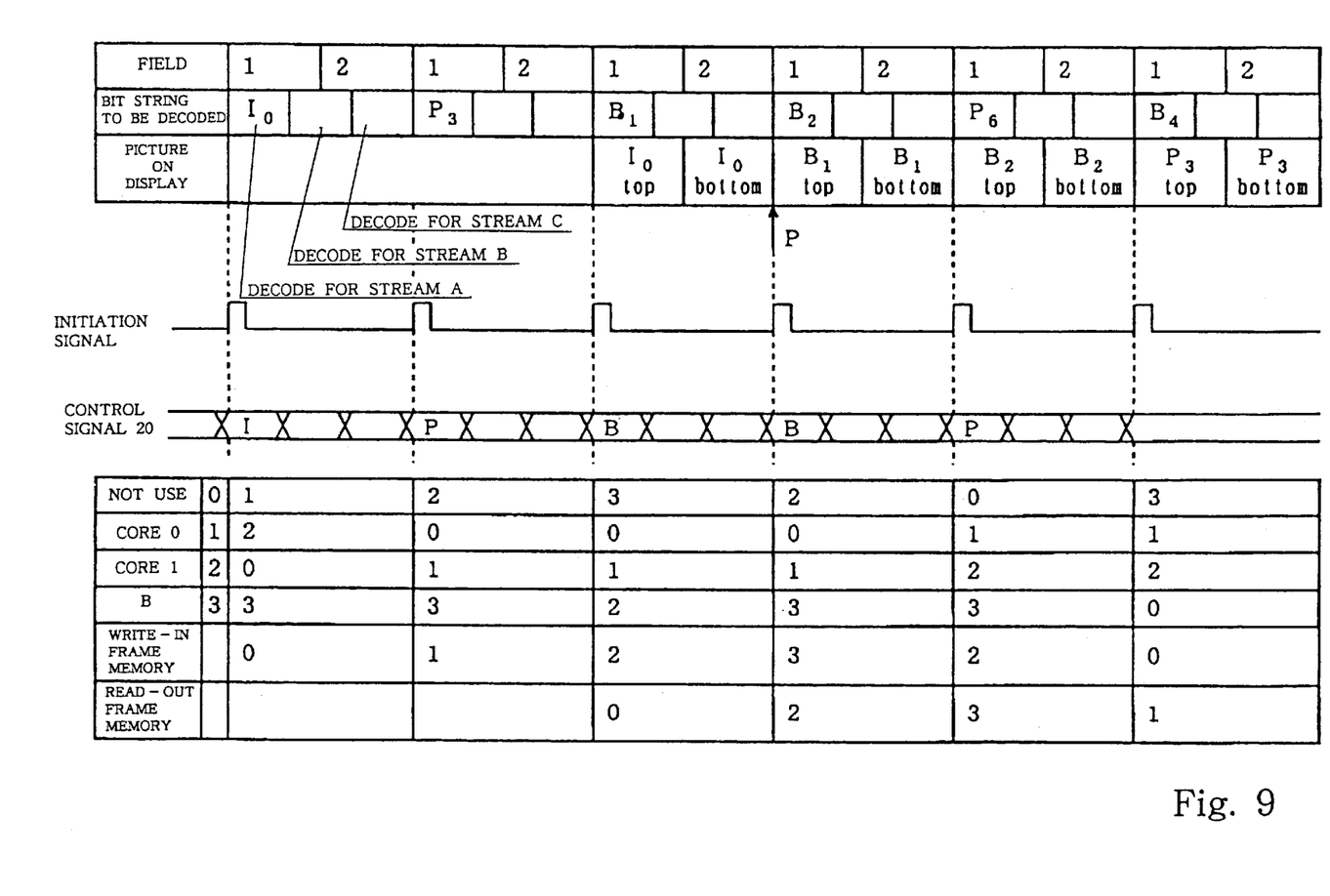
FIG. 9 is a timing chart showing a concurrent reproduction of plural pictures containing B-picture on a display.

FIG. 9 illustrates a reproduction of pictures according to the present invention. Time passes from the left side to the right side, and FIG. 9 shows a field, a bit string of the data stream A to be decoded, a picture to be displayed, a frame memory A0/A1/A2/A3 to which a piece of video data information is written and a frame memory or frame memories A0/A1/A2/A3 from which a piece or pieces of video data information are read out. The frame memory or memories are designated without "A". In the reproduction of pictures according to the present invention, a picture in each frame requires two scannings on the screen of the display 3, and the fields "1" and "2" are corresponding to the two scannings. A part of the picture is reproduced through the first scanning "1", and is labeled with "top". The other part of the picture is reproduced through the second scanning "2", and is labeled with "bottom". Although FIG. 9 illustrates the reproduction for the data stream A, the pictures represented by the data streams B and C are also reproduced in two third of each frame in a time sharing fashion.

"Not Use", "Core 0", "Core 1" and "B" are indicative of variables of an algorithm used in the generation of the memory control signals 23/24/25. The variable "Core 1" is indicative of the reference code assigned to a frame memory A0/A1/A2/A3 where a piece of video data information representative of the latest core picture is stored, and the piece of video data information is to be read out therefrom in the decoding for the bit string representative of a B-picture. The frame memory serves as the second read-out memory.

The variable "Core 0" is indicative of the reference code assigned to a frame memory A0/A1/A2/A3 where another piece of video data information representative of another core picture before the latest core picture is stored, and the piece of video data information is to be read out therefrom in the decoding for the bit string representative of the B-picture. The frame memory serves as the first read-out memory.

The variable "B" is indicative of the reference code assigned to a frame memory A0/A1/A2/A3 where a piece of video data information representative of the latest B-picture is stored.

The variable "Not Use" is indicative of the reference code assigned to the fourth frame memory, i.e., the frame memory newly added to the three frame memories of the prior art system. When the picture to be reproduced is the core picture, the variable "Not Use" is indicative of the reference code identical with the reference code indicated by the variable "Core 0", because the piece of video data information specified by the variable "Core 0" is never used in the decoding. If the picture to be reproduced is a B-picture, the variable "Not Use" is indicative of the reference code identical with the reference code indicated by the variable "B", because the piece of video data information specified by the variable "B" is never used in the decoding. If the next picture to be reproduced is also a core picture or a B-picture, the reference code of the variable "Not Use" is identical with that of the variable "Core 1" or that of the variable "B". As a result, pieces of video data information are freely assignable to the frame memories A0/A1/A2/A3.

Figure 10:
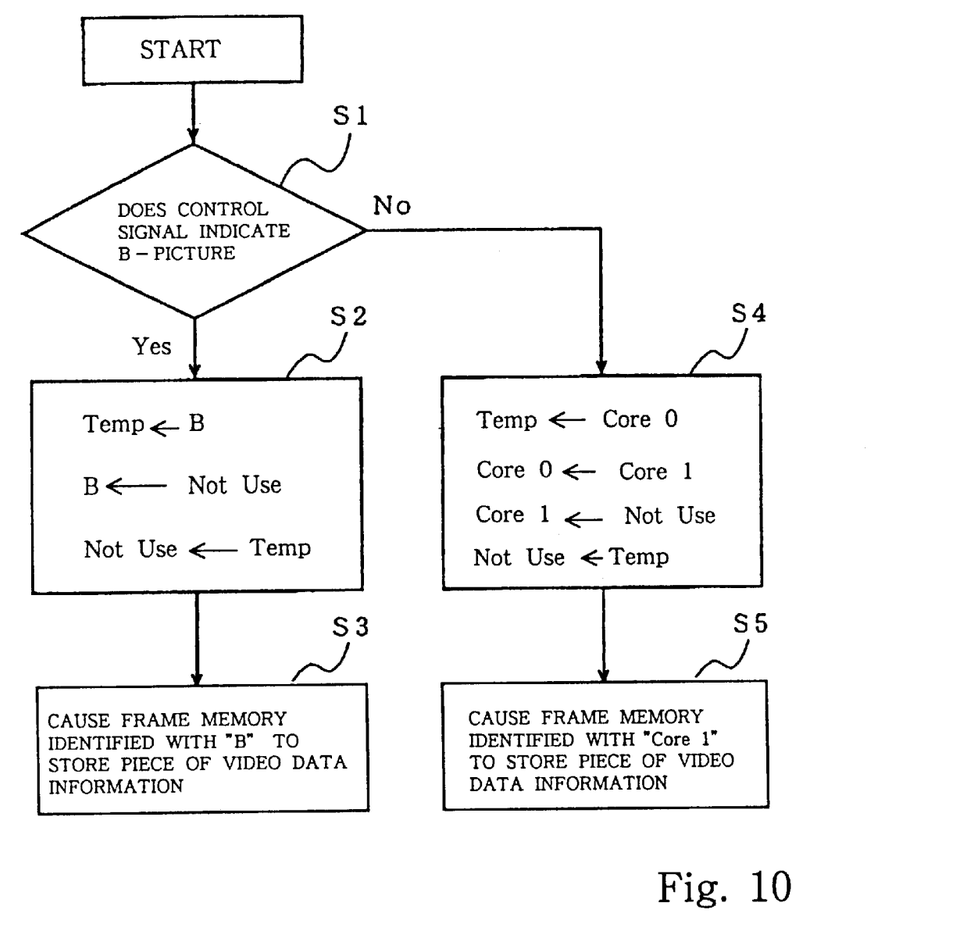
FIG. 10 is a flow chart showing an algorithm for determining a frame memory where a piece of video data information is stored.

The frame memory controller 8A determines the frame memory A0/A1/A2/A3 to store a piece of video data information through a method shown in FIG. 10. Although the other frame memory controllers 8B/8C carry out the same sequence in parallel to the frame memory controller 8A, description is made on the frame memory controller 8A, and the other frame memory controllers 8B/8C are not described.

When a bit string is supplied from the selector 6 to the variable length decoder VLD, the variable length decoder VLD decodes the bit string to the decoded signal, and produces the control signal 20 representative of the kind of picture. The decoded signal sequentially passes the inverse quantizer IQ and the two-dimensional inverse discrete cosine converter IDCT, and reaches the motion controller MC.

On the other hand, the control signal 20 is supplied to the MPEG video controller 5, and the frame memory controller 8A checks the control signal 20 to see whether or not the bit string represents a B-picture as by step S1. When the control signal 20 indicates that the bit string represents a B-picture, the answer at step S1 is given affirmative, and the frame memory controller 8A rewrites the variables "B", "Not Use" and an intermediate variable "temp" as by step S2. Namely, the frame memory controller 8A changes the variable "temp" to the reference code identical with that of the variable B, the variable B to the reference code identical with that of the variable "Not Use" and the variable "Not Use" to the reference code identical with that of the variable "temp". Thereafter, the frame memory controller 8A supplies the memory control signals 23/24/25 to the address generator 9, and causes the frame memory identified with the variable "B" to store the piece of video data information as by step S3. Thus, the reference code of the variable "B" is temporarily stored in the variable "temp", and the reference code of the intermediate variable "temp" is stored in the variable "Not Use". As a result, the piece of video data information is assigned to the unused frame memory, and is stored therein.

On the other hand, if the control signal S20 indicates that the picture to be reproduced is a core picture, the answer at step S1 is given negative, and the frame memory controller 8A rewrites the variables "Core 0", "temp", "Core 1" and "Not Use" as by step S4. In detail, the frame memory controller 8A changes the intermediate variable "temp" to the reference code identical with that of the variable "Core 0", then the variable "Core 0" to the reference code identical with that of the variable "Core 1", then the variable "Core 1" to the reference identical with that of the variable "Not Use", and, finally, the variable "Not Use" to the reference code identical with that of the intermediate variable "temp". Thus, the variable "Core 1" is indicative of the frame memory to store the piece of video data information. The reference code of the variable "Core 1" is stored in the variable "Core 0", and the piece of video data information representative of a core picture one picture before the latest core picture is stored in the frame memory specified by the variable "Core 0". The previous reference code of the variable "Core 0" is useless, and is transferred to the variable "Not Use".

The motion compensator MC transfers the piece of video data information to the frame memory specified by the variable "Core 1", and the frame memory controller 8A causes the frame memory specified by the variable "Core 1" to store the piece of video data information as by step S5.

As will be understood from the foregoing description, the frame memory controller 8A appropriately changes the reference codes of the four variables "Core 1", "Core 0", "B" and "Not Use" and the reference code of the intermediate variable "temp", and establishes a rotation in the frame memories A0/A1/A2/A3. Taking a picture as a unit, the MPEG decoding system instructs the single MPEG video decoder 1 to smoothly decode plural bit strings of the data streams A/B/C, and concurrently reproduces pictures on the screen of the display 3. In fact, the frame memory controllers 8A/8B/8C allow the motion compensator MC to store the pieces of video data information each in any one of the associated frame memories A0/A1/A2/A3, B0/B1/B2/B3 or C0/C1/C2/C3.

Turning back to FIG. 9 of the drawings, the variables "Not Use", "Core 0", "Core 1" and "B" have been set to "0", "1", "2" and "3", i.e., reference codes A0, A1, A2 and A3, respectively. The bit strings are sequentially supplied to the variable length decoder VLD as shown in FIG. 2. In the first frame period, a bit string representative of picture I0 is decoded, and the control signal 20 is indicative of the I-picture. The frame memory controller 8A takes the route consisting of steps S1/S4/5, and the variables "Not Use", "Core 0", "Core 1" and "B" are changed to "1", "2", "0" and "3", respectively. As a result, the piece of video data information representative of the picture I0 is stored in the frame memory A0. The frame memory controller 8A consumes a third of the frame period for storing the piece of video data information in the frame memory A0, and the remaining frame period is shared between the frame memory controller 8B and the frame memory controller 8C. The frame memory controller 8B selects one of the frame memories B0/B1/B2/B3 through the route S1/S4/S5 or another route S1/S2/S3, and a piece of video data information is stored in the selected frame memory. Similarly, the frame memory controller 8C selects one of the frame memories C0/C1/C2/C3 through the route S1/S4/S5 or S1/S2/S3, and a piece of video data information is stored in the selected frame memory. Thus, the frame period is shared between the frame memory controllers 8A/8B/8C, and the piece of video data information representative of the picture I0 in the data stream A, the piece of video data information representative of the picture in the data stream B and the piece of video data information representative of the picture in the data stream C are stored in one of the associated frame memories A0/A1/A2/A3, one of the associated frame memories B0/B1/B2/B3 and one of the frame memories C0/C1/C2/C3, respectively.

In the third frame period, the picture I0, i.e., the parts of the picture I0top and I0bottom are reproduced on the screen of the display 3, and a bit string representative of picture B1 is decoded. The variables "Not Use", "Core 0", "Core 1" and "B" are indicative of the reference codes "3", "0", "1" and "2", respectively, and the piece of video data information representative of the picture I0, the piece of video data information representative of the picture P3 and the piece of video data information representative of the picture B1 are stored in the frame memories A0, A1 and A2, respectively. The MPEG video decoder 1 starts to decode a bit string representative of picture B2 at time P. The variables "Not Use", "Core 0", "Core 1" and "B" are indicative of "2", "0", "1" and "3", respectively. For this reason, the piece of video data information representative of the picture B2 is stored in the unused frame memory A3 at time P, and the motion compensator MC uses the piece of video data information representative of the picture I0 stored in the frame memory A0 and the piece of video data information representative of the picture P3 stored in the frame memory A1 as the reference pictures. While the display 3 is reproducing the picture B1, the piece of video data information is read out from the frame memory A2. Thus, the pieces of video data information representative of the pictures B1 and B2 are stored in the different frame memories A2 and A3, and the picture B1 is stable on the screen of the display 3.

Comparing the variable "Not Use" with the write-in frame memory, it is understood that the variable "Not Use" is indicative of the write-in frame memory, i.e., the frame memory for storing the piece of video data information in the next frame, and the piece of video data information is transferred from the read-out memory serving as the write-in memory in the previous frame period to the display 3. When the piece of video data information to be stored in the frame memory is representative of the B-picture, the pieces of video data information are read out from the frame memories indicated by the variables "Core 0" and "Core 1". On the other hand, when the piece of video data information to be stored in the frame memory is representative of the P-picture, the frame memory indicated by the variable "Core 1" serves as the write-in frame memory, and the reference picture is represented by the piece of video data information indicated by the variable "Core 0".

Figure 11:
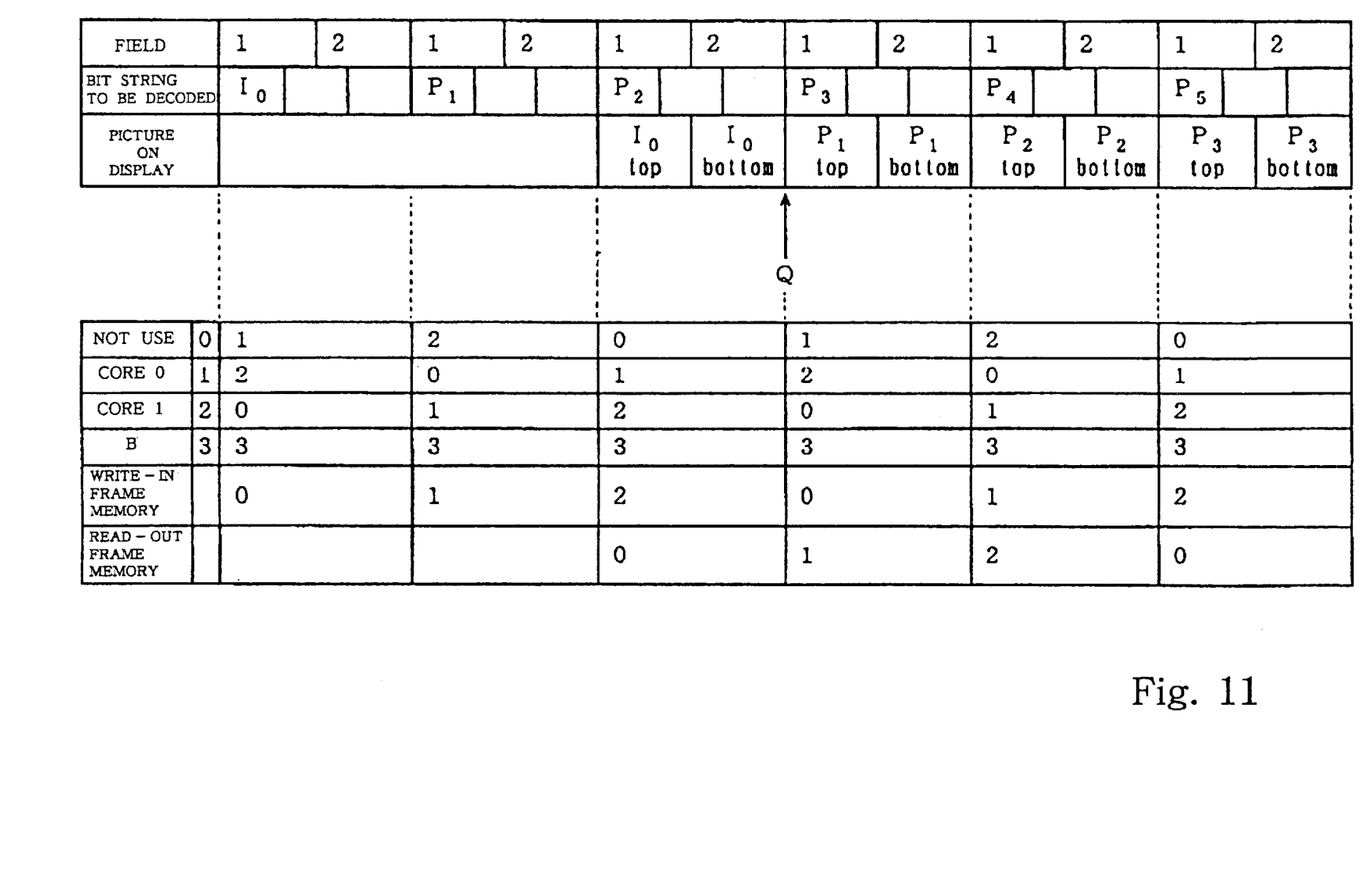
FIG. 11 is a timing chart showing a concurrent reproduction of plural pictures without B-picture on the display.

Even if the data stream A does not contain any bit string representative of B-picture, the MPEG decoding system concurrently reproduces pictures on the screen of the display 3. The data stream A contains bit strings representative of I-pictures and P-pictures, and FIG. 11 illustrates the reproduction of the pictures without any B-picture. Although the data stream A is processed in FIG. 11, the other data streams B/C are also processed as similar to those in FIG. 9.

In the frame period before time Q, the variables "Not Use", "Core 0", "Core 1" and "B" are indicative of "0", "1", "2" and "3", respectively. The MPEG video decoding system stores the pieces of video data information representative of the picture I0, the picture P1 and the picture P2 in the frame memories A0, A1 and A2, respectively. The MPEG video decoder 1 starts to decode a bit string representative of a picture P3 at time Q. The frame memory controller 8A executes the sequence shown in FIG. 10, and changes the variables "Not Use", "Core 0", "Core 1" and "B" to "1", "2", "0" and "3", respectively. As a result, the piece of video data information representative of the picture P3 is stored in the frame memory A0. The piece of video data information stored in the frame memory A2 is used as the reference picture for producing the piece of video data information representative of the picture P3. While the MPEG video decoder 1 is storing the piece of video data information representative of the picture P3, the piece of video data information representative of the picture P1 is read out from the frame memory A1, and is supplied to the display 3. Thus, the pieces of video data information representative of the pictures P3 and P1 are written into and read out from the different frame memories A0/A1. This results in enhancement of stability of the picture P1 on the screen of the display 3.

As will be appreciated from the foregoing description, the MPEG video decoding system according to the present invention decodes the bit strings of the data streams A/B/C in each frame period, and determines the frame memory to store the piece of video data information of each data stream through the sequence shown in FIG. 10 at the initiation of the decoding. As a result, the piece of video data information to be stored in the memory 2 and the piece of video data information to be transferred to the display 3 are assigned to different frame memories. This results in the stable pictures concurrently reproduced on the screen of the display 3.

The algorithm shown in FIG. 10 is implemented by either software or hardware. The software implementation is a set of programmed instructions sequentially executed by a processor. The set of programmed instructions may be stored in an information storage medium such as, for example, a semiconductor memory, a magnetic disk and so forth. The set of programmed instructions are sequentially fetched by the frame memory controllers 8A/8B/8C, and achieves the followings.

First, the frame memory controller 8A/8B/8C manages the variables "Core 1", "Core 0", "B", "Not Use" and "temp" through an execution of programmed instructions. The variable "Core 1" is indicative of the reference code of the frame memory where the piece of video data information representative of the latest core picture is stored. The variable "Core 0" is indicative of the reference code of the frame memory where the piece of video data information representative of the core picture prior to the latest picture. The variable "B" is indicative of the reference code of the frame memory where the piece of video data information representative of the latest B-picture. The variable "Not Use" is indicative of the reference code assigned to the unused frame memory. When a bit string representative of a B-picture is decoded, the frame memory controller 8A/8B/8C transfers the reference codes from the variables "B", "Not Use" and "temp" to the variables "temp", "B" and "Not Use", and, accordingly, changes the variables "temp", "B" and "Not Use" to the reference codes identical with those of the variables "B", "Not Use" and "temp", respectively. If a bit string is representative of a core picture, the frame memory controller 8A/8B/8C transfers the reference codes from the variables "Core 0", "Core 1" and "Not Use" to the variables "temp", "Core 0", "Core 1" and "Not Use", and, accordingly, changes the variables "temp", "Core 0", "Core 1" and "Not Use" to the reference codes identical with those of the variables "Core 0", "Core 1", "Not Use" and "temp". Thus, the frame memory controller 8A/8B/8C specifies the frame memory for storing the piece of video data information through the management of the variables depending upon the kind of picture.

Figure 12:
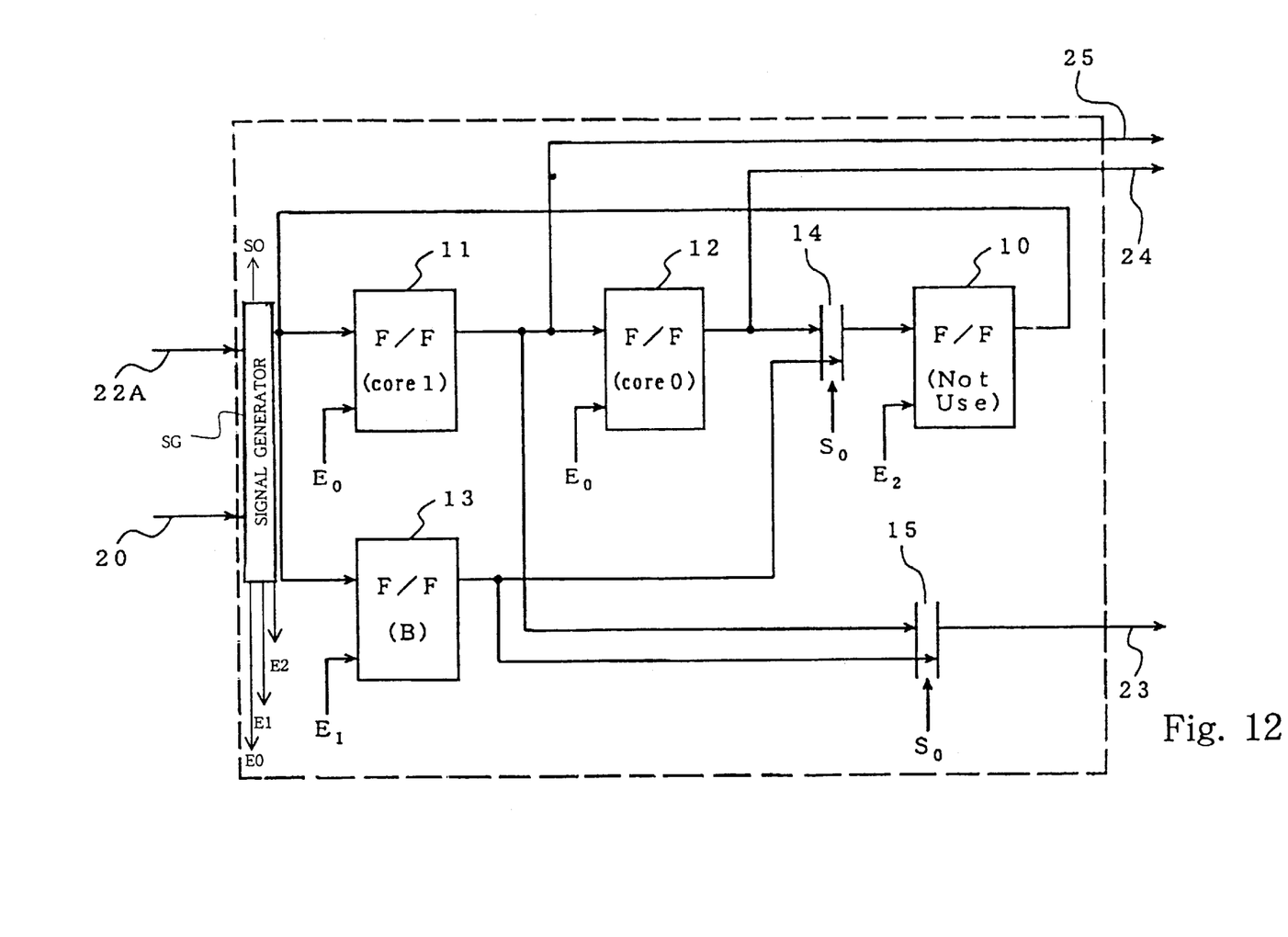
FIG. 12 is a block diagram showing the circuit configuration of a frame memory controller incorporated in the MPEG video controller.

The algorithm is implemented by an electric circuit shown in FIG. 12. The electric circuit serves as each frame memory controller 8A/8B/8C. Four 2-bit flip-flop circuits 10/11/12/13, selectors 14/15 and a signal generator SG form in combination the electric circuit. The signal generator SG is responsive to the control signal 20 and the initiation signal 22A so as to selectively change enable signals E0/E1/E2 to active logic "1" level, and supplies the enable signal E0, the enable signal E1 and the enable signal E2 to the flip-flop circuits 11/12, the flip-flop circuit 13 and the flip-flop circuit 10, respectively. If a bit string to be decoded is representative of the core picture, the selector 14 selects the 2-bit flip-flop circuit 12, and the other selector 15 selects the 2-bit flip-flop circuit 11. On the other hand, when the bit string is representative of the B-picture, the selector 14 connects the 2-bit flip-flop circuit 13 to the 2-bit flip-flop circuit 10, and the selector 15 also connects the 2-bit flip-flop circuit 13 to the signal line assigned to the memory control signal 23. The flip-flop circuits 11/12 are connected to the signal lines assigned to the memory control signals 25/24, respectively. The flip-flop circuits 10/11/12 form a rotation path for the core picture, and selectively store the reference codes [00] –[11]. Thus, a piece of video data information is appropriately stored in selected one of the frame memories.

The electric circuit behaves as follows. Assuming now that the control signal 20 is indicative of the core picture, when the initiation signal 22A is changed to logic "1" level, an enable signal E0 is changed to logic "1" level, and is supplied to the flip-flop circuits 11/12. Then, the logic level at the output node of the flip-flop circuit 10 and the logic level at the output node of the flip-flop circuit 11 are stored in the flip-flop circuit 11 and the flip-flop circuit 12, respectively. When the initiation signal 22A is changed to logic "1" level, an enable signal E2 is changed to logic "1" level, and the flip-flop circuit 10 stores the logic level at the output node of the selector 14 depending upon the kind of picture. In detail, when the control signal 20 is indicative of the core picture, the selector 14 supplies the logic level from the output node of the flip-flop circuit 12 to the input node of the flip-flop circuit 10, and the logic level at the output node of the flip-flop circuit 12 is stored in the flip-flop circuit 10. On the other hand, if the control signal 20 is indicative of the B-picture, the selector supplies the logic level from the output node of the flip-flop circuit 13 to the input node of the flip-flop circuit 10, and the logic level at the output node of the flip-flop circuit 13 is stored in the flip-flop circuit 10. When the initiation signal 22A is changed to the logic "1" level, the signal generator SG is responsive to the control signal 20 indicative of the B-picture so as to change the enable signal E1 to the logic "1" level, and the logic level at the output node of the flip-flop circuit 10 is stored in the flip-flop circuit 13.

As will be appreciated from the foregoing description, the MPEG decoding system according to the present invention has the MPEG video controller 5 operative to selectively assign the four frame memories to the pieces of video data information representative of different kinds of pictures. This means that any one of the frame memories is never exclusively assigned a particular kind of picture. A piece of video data information is read out from one of the frame memories in a frame period, and another piece of video data information is written into another frame memory in the frame period. Thus, the data read-out and the data write-in are never carried out on one of the frame memories in the frame period. This results in that the pictures on the display 3 are stable at all times.

In the above-described embodiment, the variable length decoder VLD, the inverse quantizer IQ and the two-dimensional inverse discrete cosine converter IDCT as a whole constitute a decoding section, and the motion compensator MC serves as an information processor.

Although a particular embodiment of the present invention has been shown and described, it will be apparent to those skilled in the art that various changes and modifications may be made without departing from the spirit and scope of the present invention. For example, the data path from the variable length decoder VLD to the motion compensator MC is replaceable with another kind of decoding circuit.

What is claimed is:

1. A decoding system for producing pieces of video data information representative of plural kinds of pictures to be reproduced on a screen of a display from compressed data streams having bit strings representative of said plural kinds of pictures and coded through an inter-frame predictive coding technique, comprising:

plural memories respectively assigned to said compressed data streams, each of said plural memories having plural frame memories more than frame memories required for producing any one of said pieces of video data information;

a decoding section selectively supplied with said bit strings of said compressed data streams, and producing output signals representative of said pieces of video data information and a first control signal representative of one of said plural kinds of picture represented by the bit string just processed;

an information processor connected to said decoding section, producing the pieces of video data information from said output signals or through an information processing between the pieces of video data information represented by said output signals and the pieces of video data information already stored in said plural memories, and storing each of said pieces of video data information in one of said plural frame memories of the associated one of said plural memories;

a controller responsive to said first control signal so as to select one of said plural frame memories of associated one of said plural memories, and instructing said information processor to transfer the piece of video data information produced from said bit string just processed to said one of said plural frame memories for replacing an invalid piece of video data information already stored therein with said piece of video data information; and a synchronous signal generator producing a first synchronous signal supplied to said controller and a second synchronous signal supplied to said display for reading out said piece of video data information;

wherein said compressed data streams are coded on the basis of standards of motion picture experts group, and said plural kinds of pictures are an I-picture coded in a frame without any piece of video data information in a different frame, a P-picture coded in a frame with reference to a piece of video data information in a first predetermined frame before said frame and a B-pictured coded in a frame with reference to a piece of video data information in a second predetermined frame before said frame and a third predetermined frame after said frame;

wherein plural pictures selectively categorized in said I-picture, said P-picture and said B-picture are concurrently reproduced on said screen in a single frame period, and said I-picture and said P-picture serve as a core picture; and wherein said controller includes;

a timing generator responsive to said first synchronous signal so as to generate plural initiation signals in each frame period at intervals;

plural frame memory controllers respectively associated with said compressed data streams and each responsive to said first control signal so as to selectively produce a second control signal representative of one of said of said plural frame memories of the associated memory for writing the piece of video data information thereinto, a third control signal representative of another of said plural frame memories of said associated memory for reading out the piece of video data information therefrom and a fourth control signal representative of yet another of said plural frame memories of said associated memory for reading out the piece of video data information; and an address generator responsive to said second, third and fourth control signals so as to produce address signals selectively supplied to said plural memories.

2. The decoding system as set forth in claim 1, in which each of said plural frame memory controllers includes a set of programmed instructions stored in an information storage medium, and a data processor connected to said information storage medium and sequentially executing said programmed instructions so as to realize a first means for defining a first variable indicative of one of said plural frame memories for storing the latest core picture, a second variable indicative of another of said plural frame memories for storing another core picture prior to said latest core picture, a third variable indicative of yet another of said plural frame memories for storing the latest B-picture, a fourth variable indicative of still another of said plural frame memories presently unused and a fifth variable used as a temporary storage, a second means transferring the contents of said third, fourth and fifth variables to said fifth, third and fourth variables, respectively, for changing the contents of said fifth, third and fourth variables when said bit string presently processed is representative of said B-picture, a third means transferring the contents of said second, first, fourth and fifth variables to said fifth, second, first and fourth variables, respectively, for changing the contents of said fifth, second, first and fourth variables when said bit string presently processed is representative of said core picture, and a fourth means producing said second control signal indicative of the contents of said third variable when said bit string presently processed is representative of said B-picture, said fourth means producing said second control signal indicative of the contents of said first variable when said bit string presently processed is representative of said core picture.

3. The decoding system as set forth in claim 1, in which each of said plural frame memory controllers includes a first flip-flop circuit having a first input node, a first output node for producing said fourth control signal and a first control node supplied with a first enable signal, a second flip-flop circuit having a second input node connected to said first output node, a second output node for producing said third control signal and a second control node supplied with said first enable signal, a third flip-flop circuit having a third input node, a third output node and a third control node supplied with a second enable signal, a fourth flip-flop circuit having a fourth input node, a fourth output node connected to said first input node and said third input node and a fourth control node supplied with a third enable signal, a first selector having a fifth input node connected to said second output node, a sixth input node connected to said third output node and a fifth output node connected to said fourth input node and responsive to a selecting signal for selectively connecting said fifth input node and said sixth input node to said fifth output node, a second selector having a seventh input node connected to said first output node, an eighth input node connected to said third output node and a sixth output node for outputting said second control signal and responsive to said first selecting signal for selectively connecting said seventh input node and said eighth input node to said sixth output node, and a signal generator responsive to associated one of said plural initiation signals and said first control signal so as to produce said first enable signal, said second enable signal, said third enable signal and said selecting signal, said first enable signal being changed to an active level when said one of said plural initiation signals and said first control signal are indicative of an active and said core picture, respectively, said second enable signal being changed to said active level when said one of said plural initiation signals and said first control signal are indicative of said active level and said B-picture, respectively, said third enable signal being changed to said active level when said one of said plural initiation signals and said first control signal are indicative of said active level and one of said core picture and said B-picture, respectively, said selecting signal causing said first selector and said second selector to connect said fifth input node and said seventh input node to said fifth output node and said sixth output node when said first control signal is indicative of said core picture, said selecting signal causing said first selector and said second selector to connect said sixth input node and said eighth input node to said fifth output node and said sixth output node when said first control signal is indicative of said B-picture.

4. The decoding system as set forth in claim 1, further comprising a selector having plural input nodes respectively supplied with said compressed data streams and an output node connected to said decoding section and transferring the bit strings from said plural input nodes to said output node in a time sharing fashion.

5. The decoding system as set forth in claim 4, in which said decoding section includes a variable length decoder connected to said output node of said selector and producing decoded signals from said bit strings, an inverse quantizer connected to said variable length decoder and producing quantized signals from said decoded signals, and a two-dimensional inverse discrete cosine converter connected between said inverse quantizer and said information processor and producing converted signals from said quantized signals.

\* \* \* \* \*